United States Patent [19]
Abbing et al.

[11] Patent Number: 4,934,248
[45] Date of Patent: Jun. 19, 1990

[54] BRAKE BOOSTER

[75] Inventors: Andreas Abbing, Ludwigsburg; Hannes Bertling, Vaihingen/Enz; Georg Kehl; Heinz Siegel, both of Stuttgart, all of Fed. Rep. of Germany

[73] Assignee: Robert Bosch GmbH, Stuttgart, Fed. Rep. of Germany

[21] Appl. No.: 344,922

[22] Filed: Apr. 28, 1989

Related U.S. Application Data

[62] Division of Ser. No. 186,876, May 17, 1988, abandoned.

[30] Foreign Application Priority Data

May 9, 1987 [DE] Fed. Rep. of Germany ....... 3715567

[51] Int. Cl.$^5$ ................................. F15B 9/10
[52] U.S. Cl. ................................. 91/376 R
[58] Field of Search ............... 91/376 R, 374, 368, 91/358

[56] References Cited

U.S. PATENT DOCUMENTS

| | | | |
|---|---|---|---|
| 2,413,287 | 9/1944 | Bush | 91/376 |
| 2,761,427 | 9/1951 | Shumaker | 91/376 |
| 2,883,970 | 4/1959 | Stelzer | 91/376 |
| 2,902,829 | 9/1959 | Verbrugge | 91/376 |
| 3,113,489 | 10/1963 | Cruse et al. | 91/376 |
| 3,712,177 | 1/1973 | Bach et al. | 91/376 R |
| 3,747,473 | 7/1973 | Bach et al. | 91/376 R |
| 3,834,277 | 10/1974 | Yabuta et al. | 91/376 R |
| 3,951,043 | 4/1976 | Keady | 91/376 R |
| 4,022,111 | 5/1977 | Taft | 91/376 R |

FOREIGN PATENT DOCUMENTS 2503399  1/1975  Fed. Rep. of Germany ...... 188/315

Primary Examiner—Edward K. Look
Assistant Examiner—John E. Ryznic
Attorney, Agent, or Firm—Edwin E. Greigg

[57] ABSTRACT

A brake booster in a housing, having a servo piston slidably supported in the housing and having a piston rod protruding into the housing for transmitting a brake force. In the servo piston, a work chamber is provided for receiving brake fluid drawn after the opening of a valve from a reservoir or supply container and pumped via a pump or the like. The work chamber also communicates via a further valve or the like with a return line to the supply container. To improve valve closing and to shorten the idle travel, the valve preceding the work chamber and arranged for the admission of the brake fluid is embodied by a valve bushing in a blind bore of the servo piston and by a spring-loaded closing element, such as a ball. The valve bushing is disposed between the piston rod and the ball and is traversed by a pin or the like, capable of being acted upon by the piston rod, for lifting the ball from its valve seat.

13 Claims, 3 Drawing Sheets

BRAKE BOOSTER

This application is a continuation of application Ser. No. 186,876, filed 05/17/88.

BACKGROUND OF THE INVENTION

The invention relates to improvements in brake boosters. The present invention is intended to contribute further to improving the closing of the valves in a brake booster, and in particular to facilitate centering the valves.

OBJECT AND SUMMARY OF THE INVENTION

It is a principal object of the brake booster as set forth herein to provide the advantageous feature that the closing element or valve for the admission of the servo brake fluid, and for returning the servor brake fluid, can be embodied as a simple ball. A pin that opens the inlet valve can also be connected directly with the piston rod, so that only a very slight idle travel needs to be bridged in order to actuate the valve.

Preferably, the entire valve assembly is seated in a blind bore in the servo piston. The inlet for the servo brake fluid is as a rule located on the bottom of the blind bore, where a chamber is formed. The chamber is defined by a valve bushing that has a valve seat for the inlet valve. The closing element of this valve, which in the context of the present invention is embodied as a ball, is located in the chamber. It is braced against the bottom of the blind bore via a shell or annular flange or via a spring. The shell or annular flange has sufficient radial play relative to the inner wall of the blind bore that centering of the ball on the valve seat is facilitated.

In an exemplary embodiment of the invention, the ball is connected to a bolt that engages a bottom chamber in the servo piston. The bolt is braced laterally with respect to the bottom chamber via a lip seal, so that particularly upon valve closure it remains movable relative to the longitudinal axis of the brake booster. The sealing diameter in this region should be approximately equal to the sealing diameter of the valve seat so that the valve is completely pressure-balanced or is fully in a state of pressure equilibrium.

According to the invention, the bottom chamber engaged by the bolt also communicates via lines with the work chamber itself. If the inlet valve is opened, then servo brake fluid also flows into this bottom chamber and reinforces the return of the closing element, embodied as a ball, to the valve seat of the valve bushing.

A seat valve is also provided as the valve for returning the servo brake fluid; it preferably has a ball as its closing element. It is conceivable for this ball to be connected directly with the pin for opening the inlet valve. That would make the two valves overly dependent on one another, however, which in some cases proves to the unfavorable. Preferably, the ball is therefore connected with a bolt that acts upon the pin. A stop plate and a tappet may also be provided between the bolt and the pin. The tappet, for better guidance of the pin, slides in an axial bore in the valve bushing. To allow the servo brake fluid to flow from the chamber through the inlet valve to reach the work chamber, the tappet must have conduits on its circumference.

The stop plate should be braced via a spring against a sheath, which in turn is seated in a blind bore of the valve bushing itself and there strikes a snap ring. Since the return valve closing element, likewise embodied as a ball, is either directlY connected to or is at least acted upon by the piston rod, the resultant idle travel between the two valves is very slight. As soon as the piston rod is actuated, the return valve closes and the inlet valve opens. When the stop plate strikes the sheath, it is assured that the return valve will always open after a predetermined return travel of the piston rod.

To allow the servo brake fluid to flow unhindered not only past the tappet but past the sheath into the work chamber, the rim of the blind bore in the valve bushing is penetrated by grooves, conduits or the like.

As the valve seat for the closing element of the return valve, it may be provided for the sake of simplicity that the piston rod be topped with a cap. Naturally it is also possible for the valve seat to be formed directly into the end face of the piston rod. For the sake of simplicity, the return line, or substantial portions of it, should then be disposed in the piston rod itself as well. To this end, an axial bore adjoining the valve seat is provided, which via a radial connection discharges into an annular chamber located between the piston rod and the servo piston, or a guide bushing accompanying the piston rod. Via suitable radial bores, which cross the servo piston or the guide bushing, the annular chamber communicates with the return line to the supply container.

Preferably, however, an intermediate piston, in which portions of the return line are located, is disposed between the work chamber and the piston rod. By means of the intermediate piston, the work chamber is also separated from a servo chamber located in the upper part of the blind bore in the servo piston; the servo brake fluid can be particularly effective in this upper part.

As the return line, an axial blind bore in the intermediate piston is provided, which adjoins the valve seat of the return valve and communicates via a line segment with a longitudinal bore in the servo piston. This longitudinal bore then for instance discharges in the master brake chamber, which communicates via a line with the brake fluid supply container in any event.

According to the invention, two exemplary embodiments can be distinguished from one another. In one exemplary embodiment, the intermediate piston is connected to the piston rod via a hall and socket joint, while the valve is located on the other end. In other words, in this case the valve seat is located in the work chamber itself, so that for the return of servo brake fluid, this brake fluid must flow back into the work chamber from the servo chamber. It is therefore proposed, in a particularly preferred exemplary embodiment, that the pin for opening the inlet valve is firmly connected to the intermediate piston, while the return valve is disposed on the other side of the intermediate piston. In that case, the return valve closing element, embodied as a ball, should be connected to the piston rod via a ball and socket joint. This articulated connection improves centering of the ball on the valve seat.

For guidance of the ball, the intermediate piston can also be provided with an annular collar, which in turn communicates via radial bores with the servo chamber. One advantage of this arrangement is that the brake fluid can flow out of the servo chamber directly into the return line, without first having to be returned to the work chamber. The idle travel is additionally shorted by the direct connection, via the pin, of the intermediate piston with the closing element of the inlet valve.

The intermediate piston should also be held in the servo chamber via a spring. The invention provides that the intermediate piston has a somewhat lesser diameter toward the work chamber than toward the servo chamber. As a result, the intermediate piston is held in a balanced position whatever the valve position.

To enlarge the servo chamber, it is provided that suitable conduits and grooves enable a flow around the piston rod, or a slide ring disposed on it, and this fluid can get in between the guide bushing and the servo piston. Here the servo brake fluid can be particularly effective.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
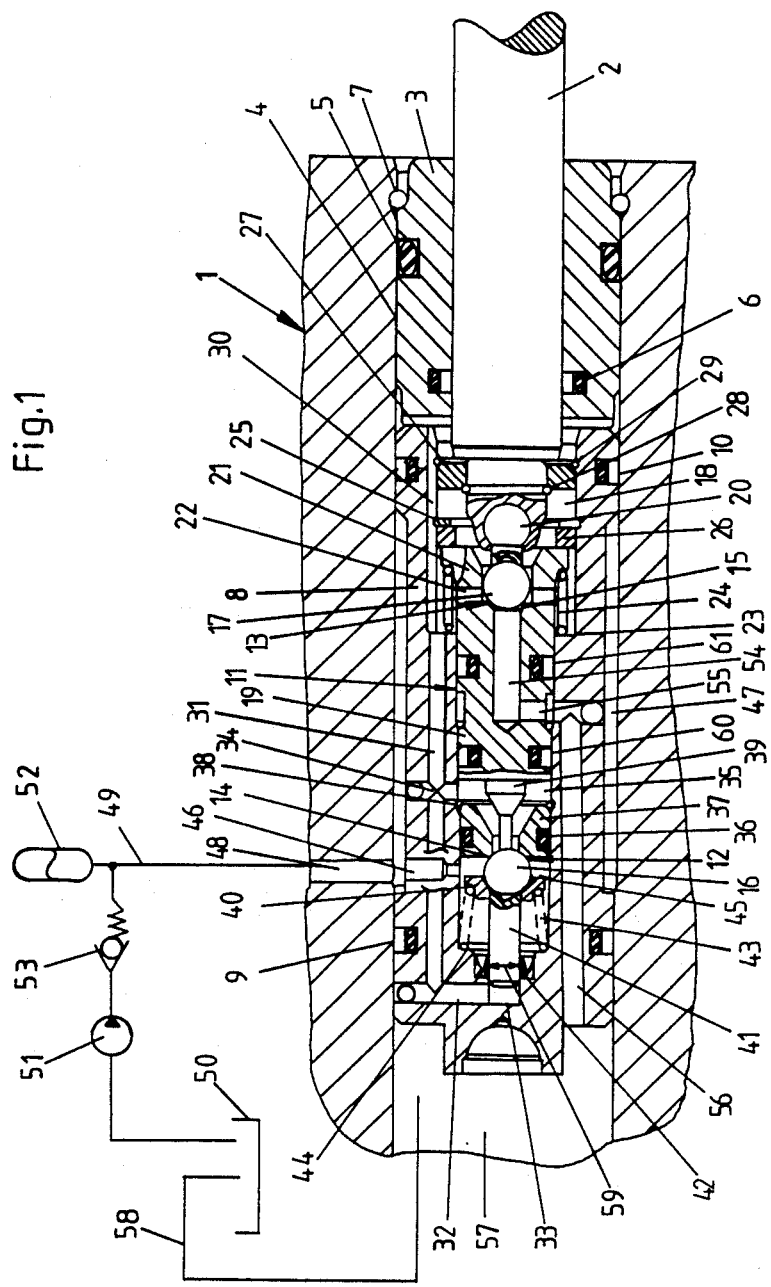
FIG. 1 is a longitudinal section through a master brake cylinder housing in the vicinity of a brake booster, with schematically shown supply elements associated with the brake booster.

As shown in FIG. 1, a brake booster is seated in a housing 1, for example of a master brake cylinder. Protruding into the housing 1 on the face end is a piston rod 2, to which a brake pedal, not further shown, is pivotably connected at the other end. The piston rod 2 is supported via a guide bushing 3 against the inner wall 4 of the housing 1; a static seal 5 is provided toward the inner wall 4, and a dynamic seal 6 is provided toward the piston rod 2. The guide bushing 3 is also axially retained in the housing 1 by a snap ring 7 on one end and by a servo piston 8 on the opposite end.

The servo piston 8 engages the guide bushing 3 at one end and is slidably supported in the housing 1, while two dynamic seals 9 and 10 are provided toward the inner housing wall 4.

The servo piston 8 has a stepped axial blind bore 11, which receives the actual brake valve. This brake valve substantially comprises two seat valves 12 and 13. Each seat valve 12 and 13 has a respective valve seat 14 and 15 and a ball 16 and 17 respectively associated with each valve seat 14 and 15.

After the guide bushing 3, the piston rod 2 is provided with a slide ring 27 which engages the blind bore 11 in the vicinity of a servo chamber 18. This servo chamber 18 is substantially defined not only by the servo piston 8, the guide bushing 3, the slide ring 27 and the piston rod 2 but also by an intermediate piston 19, in which the valve seat 15 is formed in a recess toward the piston rod 2. The ball 17 associated with this valve seat 15 has a connection with a ball and socket joint 20 supported in the inner end of the piston rod 2. The ball 17 is also surrounded by an annular collar 21 formed onto the valve seat end of the intermediate piston 19, and the seat valve 13 communicates via radial bores 22 and axial grooves 30 with the servo chamber 18. A spring 24 is supported in the blind bore 11 between this annular collar 21 and a shoulder 23 on the intermediate piston 19. A stop 26, retained by a snap ring 25, for the annular collar 21 is also provided in the servo chamber 18.

In the servo chamber 18, the piston rod 2 is supported via the slide ring 27 against the inner wall of the blind bore 11, this slide ring 27 being limited by the two snap rings 28 and 29. The slide ring 27 is spanned by the qroove 30, by way of which servo brake fluid can flow out of the servo chamber 18 into the region between the servo piston 8 and the guide bushing 3 and increase the servo pressure.

The servo chamber 18 communicates via an axially parallel longitudinal bore 31 in the servo piston 8 and via a radial bore 32 with a bottom chamber 33 in the blind bore 11. A line 34 also branches off from this longitudinal bore 31 to a work chamber 35, which is embodied between the intermediate piston 19 and a valve bushing 37 equipped with a sealing ring 36. This valve bushing 37 has the valve seat 14, on the far side of the intermediate piston 19. In one direction, toward the intermediate piston 19, the valve bushing 37 engages a snap ring 38 while in the other direction the valve bushing 37 is movable.

Beginning at the intermediate piston 19, an axially disposed pin 39 passes through both the work chamber 35 and the valve bushing 37 and engages the ball 16 to open the seat valve 12 resulting from movement of the intermediate piston 19. This hall 16 is connected to an annular flange 40 of an axially aligned bolt 41, which partly engages the bottom chamber 33 at one end and is retained opposite the blind bore by a lip seal 42 The annular flange 40 is also braced via a spring 43 against a bottom shoulder 44 in the blind bore 11.

The hall 16, annular flange 40, bolt 41 and spring 43 are located in a chamber 45, which via a radial inlet 46, an annular chamber 47 formed around the servo piston 8 between the housing 1 and the servo piston 8, and a radial bore 48 in the housing 1 communicates with an inflow line 49 for supply of a servo brake fluid. This inflow line 49 leads to a supply container 50, and appropriate supply elements, such as a pump 51, a reservoir 52 and a check valve 53 provided in the inflow line 49.

For returning the servo brake fluid to the supply container 40, an axial blind bore 54 is disposed in the intermediate piston 19 after the seat valve 13, communicating via a radial line segment 55 with a further longitudinal bore 56 in the servo piston 8. This longitudinal bore 56 discharges from the servo piston 8 into a master brake chamber 57 in the housing at the inner end of the brake booster, for example, from which a line 58 shown only schematically leads back to the supply container 50.

The mode of operation of this brake booster according to the invention is as follows:

In the chamber 45, the seat valve 12 controlling the reservoir pressure is in itself fully pressurebalanced, since the sealing diameter 59 and the diameter of the valve seat 14 are of equal size. If a brake pressure is now exerted upon the piston rod 2, the intermediate piston 19 is displaced to the left in the blind bore 11 of the servo piston 8, whereupon suitable dynamic seals 60 and 61 effect sealing. The seat valve 13 is closed at this time, because the ball 17 is pressed onto the valve seat 15.

Now the pin 39 meets the ball 16 and is pressed by movement of intermediate piston 19 to lift the ball 16 away from its valve seat 14. Through the valve gap in the seat valve 12 that is thus formed, servo brake fluid flows into the work chamber 35 and from there, via the line 34, flows first into the bottom chamber 33 and second into the servo chamber 18. In the servo chamber 18, the servo brake fluid can build up the required servo pressure to apply force on servo piston 8, which applies a force on the brake fluid chamber 57 for applying a pressure on the master cylinder, not shown.

If a pressure reduction then occurs by release of the brake pedal and movement of piston rod 2 to the right, the pressure of the pin 39 on the ball 16 lessens, and the ball is returned by the force of the spring 43 until it meets the valve seat 14 and closes the seat valve 12.

The intermediate piston 19 is also displaced to the right, following after the retreating piston rod 2, by the pressure of the spring 24 until the intermediate piston comes to a standstill at the stop 26. The ball 17 then lifts away from the valve seat 15 and permits the servo brake fluid to return from the servo chamber 18 back to the container 50, via the longitudinal groove 30, the radial bores 22, the axial bore 54, the line segment 55 and the longitudinal bore 56 that empties into chamber 57.

According to the invention, the diameter of the intermediate piston 19 near the seal 61 should the somewhat greater, by the seat surface area of the seat valve 13, than the diameter of the intermediate piston 19 near the seal 60. This assures that the intermediate piston 19 is fully pressure-balanced in any valve position.

The pivotable connection of the ball 17 with the piston rod 2 and the slight axial guidance of the bolt 41 in the bottom chamber 33 assures that the balls 16 and 17 are centered on their respective seats 14 and 15.

It should also be emphasized that after the closure of the seat valve 13 only a very short idle travel has to be spanned until the seat valve 12 that controls the reservoir pressure opens. This idle travel increases the hysteresis only slightly.

Figure 2:
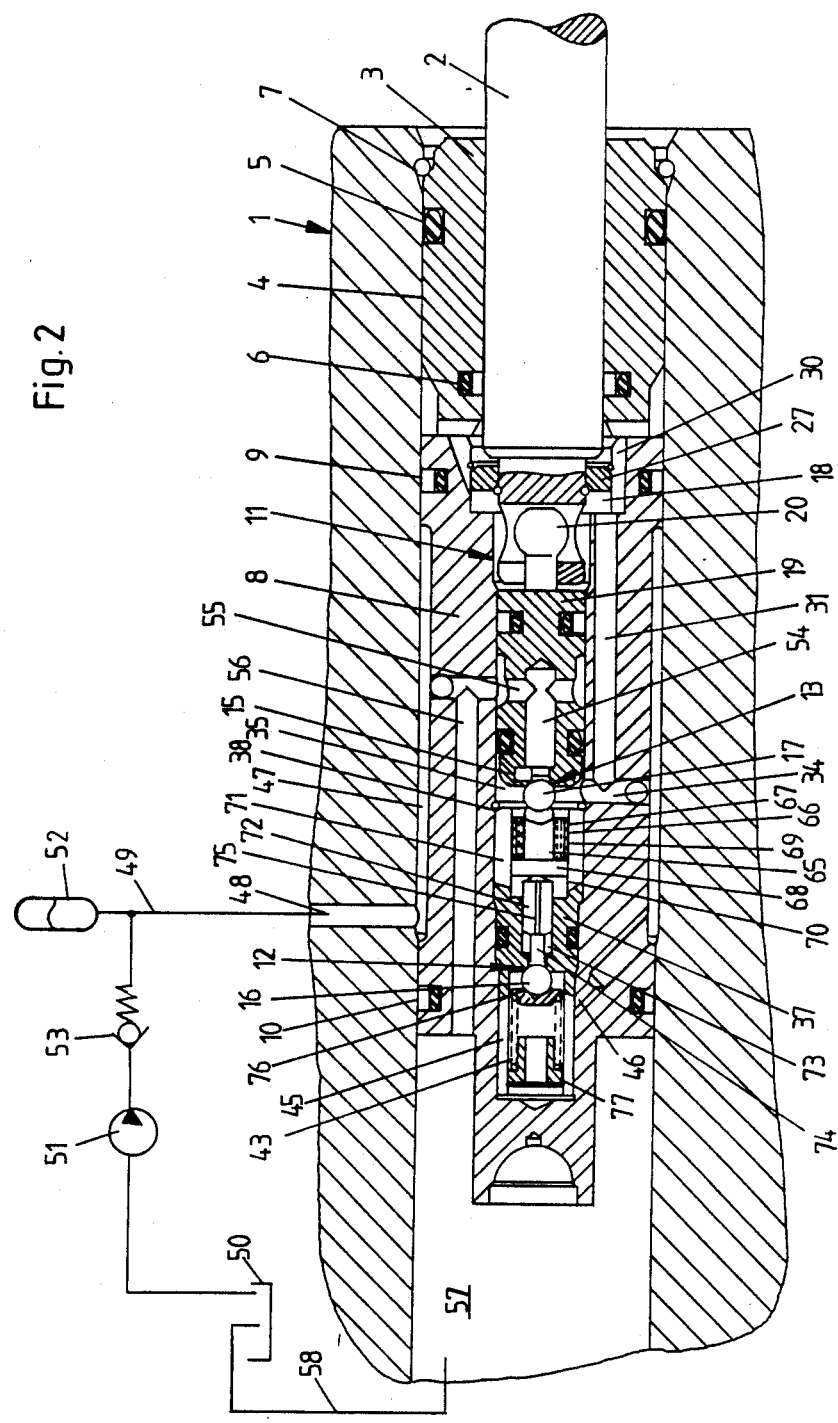
FIG. 2 is a longitudinal section through a further embodiment of a master brake cylinder in the vicinity of the brake booster of FIG. 1.

The exemplar embodiment of the brake booster of FIG. 2 substantially corresponds to that of FIG. 1, and so identical elements are identified by the same reference numerals. However, in FIG. 2 the ball and socket joint 20 is secured directly to the intermediate piston 19, and via which joint the intermediate piston 19 is connected to the piston rod 2. Contrarily, the seat valve 13 is located on the opposite face end of the intermediate piston 19, the valve seat 15 being flanged into the end face of the intermediate piston 19. This valve seat 15 serves to receive the ball 17, which in this exemplary embodiment, however, is welded to a bolt 65. This bolt 65 penetrates a sheath 66 that is braced by a snap ring 67 in the work chamber 35. After the bolt 65 penetrates the sheath 66, a stop plate 68 that strikes the sheath 66 in the terminal position is formed onto it, the bolt 65 being surrounded bY a spring 69, which is braced in the sheath 66 on a sheath collar on one end and against the stop plate 68 on the other.

The bolt 65, sheath 66 and stop plate 68 are received in a blind bore 70 in the valve bushing 37. The walls of the blind bore 70 are provided with grooves 71, which connect the work chamber 35 with the seat valve 12.

The stop plate 68 acts upon an axially aligned tappet 72, which slides in an axial bore 73 in the valve bushing 37 toward the seat valve 12. With a pin 74, this tappet 72 penetrates the seat valve 12 and engages the ball 16. The tappet 72 also has axially parallel conduits 75 on its circumference along which fluid may flow.

On the other side of the seat valve 12, the ball 16 rests in a shell 76 which is approximately equivalent to the annular flange 40 of FIG. 1. Like the annular flange 40, the shell 76 is also braced via the spring 43 in the chamber 45, the spring 43 on the other end surrounding a guide sheath 77.

In this exemplary embodiment, the inlet for the servo brake fluid from the annular chamber 47 is embodied as an inclined bore 46.

In the position of repose of the brake booster, the spring 43 keeps the seat valve 12 closed, by exerting pressure on the shell 76. This closing pressure is further reinforced by the reservoir pressure of the servo brake fluid. The spring 69 has a lesser spring force, by comparison, so that in the position of repose the force of the spring 43 cannot be overcome. Only if a brake pressure is exerted upon the tappet 72 via the piston rod 2, the intermediate piston 19, the ball 17, the bolt 65 and the stop plate 68 does the ball 16 lift from its valve seat 14 and allow passage for the servo brake fluid. This fluid flows via the grooves 71 into the work chamber 35 and from there, via the line 34 and the longitudinal bore 31, into the servo chamber 18. In other words, upon pressure buildup the seat valve 12 opens at the instant when the seat valve 13 closes. Upon a pressure reduction, however, the seat valve 13 does not open until the stop plate 68 strikes the sheath 66. In other words, in this exemplary embodiment, when the pressure is reduced, there is a predetermined idle travel, during which the inlet seat valve 12 is already closed and the outlet set valve 13 has not yet opened.

The two valves are not both pressure-balanced. Therefore, very small ball diameters and valve seat diameters are selected, in order to keep the hydraulic impact forces low. Nevertheless, the valves that are not pressure-balanced require a greater total braking force.

As soon as the stop plate 68 strikes the sheath 66, the seat valve 13 opens, and the servo brake fluid can be returned to the supply container 50 from the work chamber 35 through the axial blind bore 54, the line segment 55, the longitudinal bore 56 and the line 58.

Figure 3:
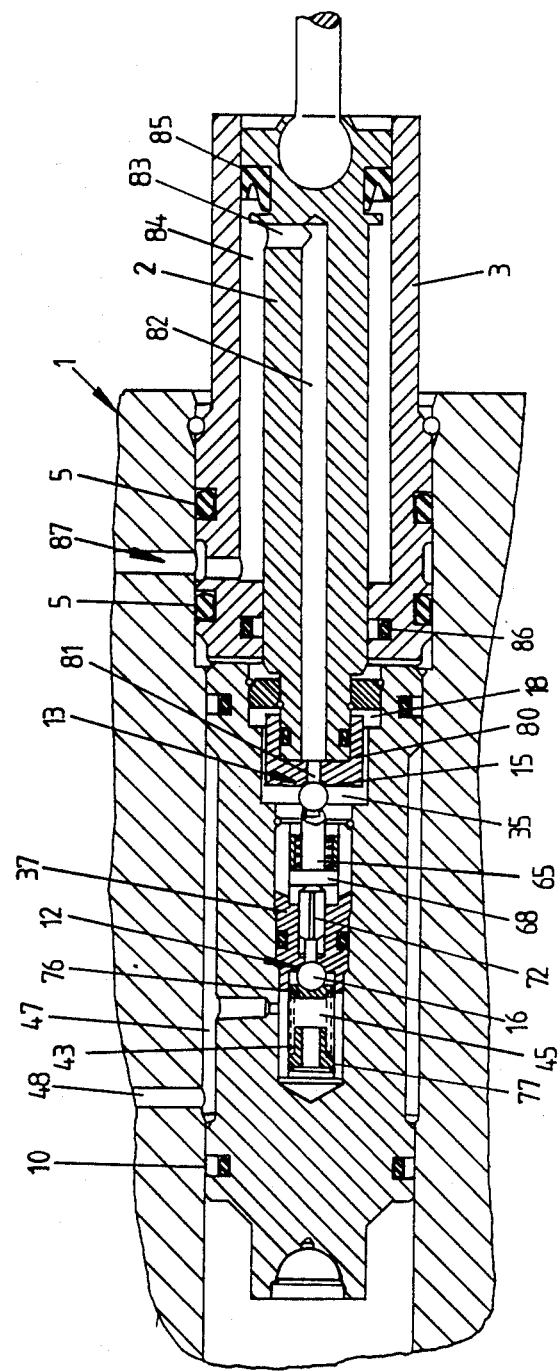
FIG. 3 is a longitudinal section through another embodiment of a master brake cylinder in the vicinity of the brake booster.

The exemplary embodiment of FIG. 3 differs from the exemplary embodiment of FIG. 2 in terms of this outflow of the servo brake fluid from the work chamber 35. In FIG. 3, the valve seat 15 of the seat valve 13 is formed toward the face end of a cap 80 that tops the end of the piston rod 2. A passage 81 that follows the valve seat 15 connects the work chamber 35 with an axial bore 82 in the piston rod 2. This axial bore 82, in turn, communicates via a radial connection 83 with an annular chamber 84 formed between the piston rod 2 and the guide bushing 3. A lip seal 85 on one end and a dynamic seal 86 on the other are provided for sealing off this annular chamber 84. The guide bushing 3 in this case has two static seals 5 toward the housing 1, between which seals the return line 87 is provided, extending through the guide bushing 3 and the housing 1. The valve ball 16 and associated parts are as set forth in FIG. 2.

The foregoing relates to preferred exemplary embodiments of the invention, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. A brake booster for motor vehicles which comprises a housing, a servo piston (8) slidably supported in said housing, a blind bore (11) in said servo piston, a guide bushing in one end of said housing, a piston rod (2) protruding into said guide bushing for transmitting a brake force, a first valve (12) including a first valve seat (14) formed in said blind bore, a work chamber (35) provided in said servo piston for receiving brake fluid drawn from a fluid supply which is controlled via said first valve (12), said work chamber adapted to communicate via a second valve (13) having a second valve seat (15) with a return line to said supply, said first valve (12) being disposed to precede said work chamber (35) for admission of the brake fluid and being embodied by a valve bushing (37) disposed in said blind bore (11) of said servo piston (8), said valve bushing including said first valve seat (14), a first valve closing element (16) adapted to close against said first valve seat, and a spring loaded closing element arranged to engage said first valve closing element (16), said valve bushing (37) being disposed between said piston rod (2) and said first valve closing element (16), and a pin is provided that transverses said piston rod (2) for lifting said first valve closing element (16) from its valve (14) to provide fluid under pressure for said brake booster, a second valve closing element (17) which operates in said work chamber (35) relative to said second valve seat (15) for returning brake fluid to said supply and said second valve closing element is connected to a bolt (65) which acts upon said pin (74) that in turn acts upon said first valve closing element (16).

2. A brake booster as defined by claim 1, in which said spring loaded closing element and said first valve closing element (16) are located in a chamber (45) that communicates with an inlet (46) for admittance of said brake fluid, and at an end of the blind bore (11) said first valve closing element (16) is supported by an annular flange via a spring (43) which rests on a guide sheath (77) of said servo piston (8).

3. A brake booster as defined by claim 1, in which said bolt (65) engages a stop plate (68) in the work chamber (35) which acts upon a tappet (72) connected to said pin (74).

4. A brake booster as defined by claim 1, in which a cap (80) is formed on an inner face of said piston rod, said cap (80) including said valve seat (15) which is closed by said second valve closing element (17).

5. A brake booster as set forth in claim 1, in which said first (16) and said second (17) valve closing elements are formed as a spherical element.

6. A brake booster as set forth in claim 2, in which said first (16) and said second (17) valve closing elements are formed as a spherical element.

7. A brake booster as defined by claim 3, in which said tappet (72) slides in an axial bore (73) in said valve bushing (37), said tappet including conduits (75) along its circumference.

8. A brake booster as defined by claim 3, in which said stop plate (68) is braced via a spring (69) against a sheath (66), which is in turn braced in a blind bore (70) in the valve bushing (37) against a snap ring (67).

9. A brake booster as set forth in claim 4, in which said first (16) and said second (17) valve closing elements are formed as a spherical element.

10. A brake booster as defined by claim 7, in which said stop plate (68) is braced via a spring (69) against a sheath (66), which is in turn braced in a blind bore (70) in the valve bushing (37) against a snap ring (67).

11. A brake booster as defined by claim 8, in which said valve bushing (37) includes grooves (71) along its periphery in the vicinity of the blind bore (70).

12. A brake booster as defined by claim 10, in which said valve bushing (37) includes grooves (71) along its periphery in the vicinity of the blind bore (70).

13. A brake booster as defined by claim 4, in which a passage (81) adjoins said second valve seat (15) to an axial bore (82) in said piston rod (2), which in turn, via a radial connection (83) and an annular chamber (84) disposed between the piston rod (2) and the guide bushing (3) communicates with a return line (87).

* * * * *